United States Patent
Uenohara et al.

(10) Patent No.: US 6,168,526 B1
(45) Date of Patent: *Jan. 2, 2001

(54) DAMPER DISK ASSEMBLY HAVING INTEGRAL RETAINING PLATE CONNECTING MEANS

(75) Inventors: Norihisa Uenohara; Hiroshi Mizukami, both of Neyagawa (JP)

(73) Assignee: Exedy Corporation, Osaka (JP)

( * ) Notice: Under 35 U.S.C. 154(b), the term of this patent shall be extended for 0 days.

This patent is subject to a terminal disclaimer.

(21) Appl. No.: 09/062,703

(22) Filed: Apr. 20, 1998

Related U.S. Application Data

(63) Continuation-in-part of application No. 08/777,871, filed on Dec. 31, 1996, now Pat. No. 5,848,937.

(30) Foreign Application Priority Data

Feb. 25, 1998 (JP) .................................. 10-043752

(51) Int. Cl.⁷ .................................................. F16D 3/12
(52) U.S. Cl. .............................................. 464/68; 464/66
(58) Field of Search .................... 464/64, 66, 67, 464/68; 192/213.31, 212, 213, 213.22; 74/574

(56) References Cited

U.S. PATENT DOCUMENTS

| | | | |
|---|---|---|---|
| 5,052,978 | * 10/1991 | Hanke | 464/68 X |
| 5,540,620 | * 7/1996 | Haneda et al. | 464/68 X |
| 5,697,846 | * 12/1997 | Uenohara | 464/64 |
| 5,725,080 | * 3/1998 | Lohaus | 192/213.22 X |
| 5,730,656 | * 3/1998 | Yamamoto | 464/68 X |
| 5,954,585 | * 9/1999 | Nagano et al. | 192/213.22 X |
| 6,083,107 | * 7/2000 | Herbst | 464/64 |

* cited by examiner

Primary Examiner—Lynne H. Browne
Assistant Examiner—Greg Binda
(74) Attorney, Agent, or Firm—Shinjyu Global IP Counselors, LLP

(57) ABSTRACT

A clutch disk assembly includes axially opposed clutch and retaining plates 102 and 103. A flange 101 having a plurality of circumferentially long recesses is arranged between the clutch and retaining plates. Plate coupling portions 109 extend from the retaining plate 103 through the recesses at the flange and connect the clutch and retaining plates together.

17 Claims, 12 Drawing Sheets

DAMPER DISK ASSEMBLY HAVING INTEGRAL RETAINING PLATE CONNECTING MEANS

This application is a continuation in part of U.S. Ser. No. 08/777,871, filed Dec. 31, 1996, which was issued as U.S. Pat. No. 5,848,937 on Dec. 15, 1998.

BACK OF THE INVENTION

A. Field of the Invention

The present invention relates to a damper disk assembly, and in particular to a damper disk assembly for use in a clutch disk assembly or the like where a retaining plate is formed with means for coupling to other members of the damper disk assembly.

B. Description of the Background Art

A clutch disk assembly used in a clutch for an automotive vehicle typically includes a pair of input plates opposed to each other, an output hub formed with a radial flange, and coil springs disposed between the flange and the input plates for elastically coupling the paired input plates to the flange but allowing limited relative rotary displacement therebetween. The paired input plates are fixed together at their radially outer portions by a plurality of stop pins for integral rotation. The stop pins extend through recesses formed near the outer periphery of the flange, respectively. The input plates are rotatable relative to the flange through a predetermined angle. When the stop pins are brought into contact with edges of the recesses, the input plates stop its rotation relative to the flange.

The conventional clutch disk assembly described above uses the stop pins as members for restricting relative rotation between the input plates and the flange. Each stop pin requires a minimum diameter, and for structural strength must be located radially inside the outer periphery of the input plates. Due to the limiting conditions associated with the arrangement of the stop pins, the torsion angle within which relative rotation between the paired input plates and the flange occurs cannot be easily increased. This means that, even if hard coil springs are used, the capacity or properties of the coil springs cannot be fully utilized, because the relative torsion angle cannot be increased sufficiently.

For reducing noises during driving such as gear noises from a driving system and resonant noises, it is necessary to minimize the torsional rigidity in the acceleration and deceleration range and thereby set the resonant frequency range of the driving system below the practical or service rotation range of the engine. For achieving such a low rigidity and a high stopper torque, it is necessary to increase the maximum allowable torsion angle.

SUMMARY OF THE INVENTION

An object of the invention is to provide a damper disk assembly with a construction which overcomes the disadvantages associated with the necessary configuration of stop pins in the prior art, and to provide the damper disk assembly with a sufficient increase in a relative torsion angle between an input member and an output member, as compared with the prior art.

In accordance with one aspect of the present invention, a damper disc assembly includes first rotary plate formed with a plurality of extending portions. Each of the extending portions is formed with a window. A second rotary plate is arranged coaxially at a first axial side of the first rotary plate, and has a plurality of first supports corresponding to the plurality of windows, respectively. A third rotary plate is arranged coaxially at a second axial side of the first rotary plate, and has a plurality of second supports corresponding to the plurality of windows, respectively. A plurality of plate-like coupling portions couple outer peripheral portions of the second and third rotary plates together, and each has a radial length shorter than a circumferential length thereof. A radially outer portion of each of the plate-like coupling portions defines a stopper. A plurality of springs are arranged within the windows and the first and second supports, elastically coupling the first rotary plate to the second and third rotary plates in the circumferential direction, and are compressed between the windows and the first and second supports when the first rotary plate rotates relative to the second and third rotary plates. Further, each of the plate-like coupling portions are arranged circumferentially between the projections, and are able to contact circumferentially with one of the stoppers in response to relative rotation between the first rotary plate and the second and third rotary plates. The stoppers and the projections are configured such that the first rotary plate and the second and third rotary plates may undergo relative rotation with respect to one another within an angular displacement range of at least 300.

In the damper disc assembly in accordance with the present invention, the circumferential angle of the projection is smaller than the circumferential angle of the window. Therefore, the circumferential space between the projections is sufficiently large and relative rotary displacement between plates can be maximized.

The foregoing and other objects, features, aspects and advantages of the present invention will become more apparent from the following detailed description, when taken in conjunction with the accompanying drawings.

DESCRIPTION OF THE PREFERRED EMBODIMENTS

First Embodiment

Figure 1:
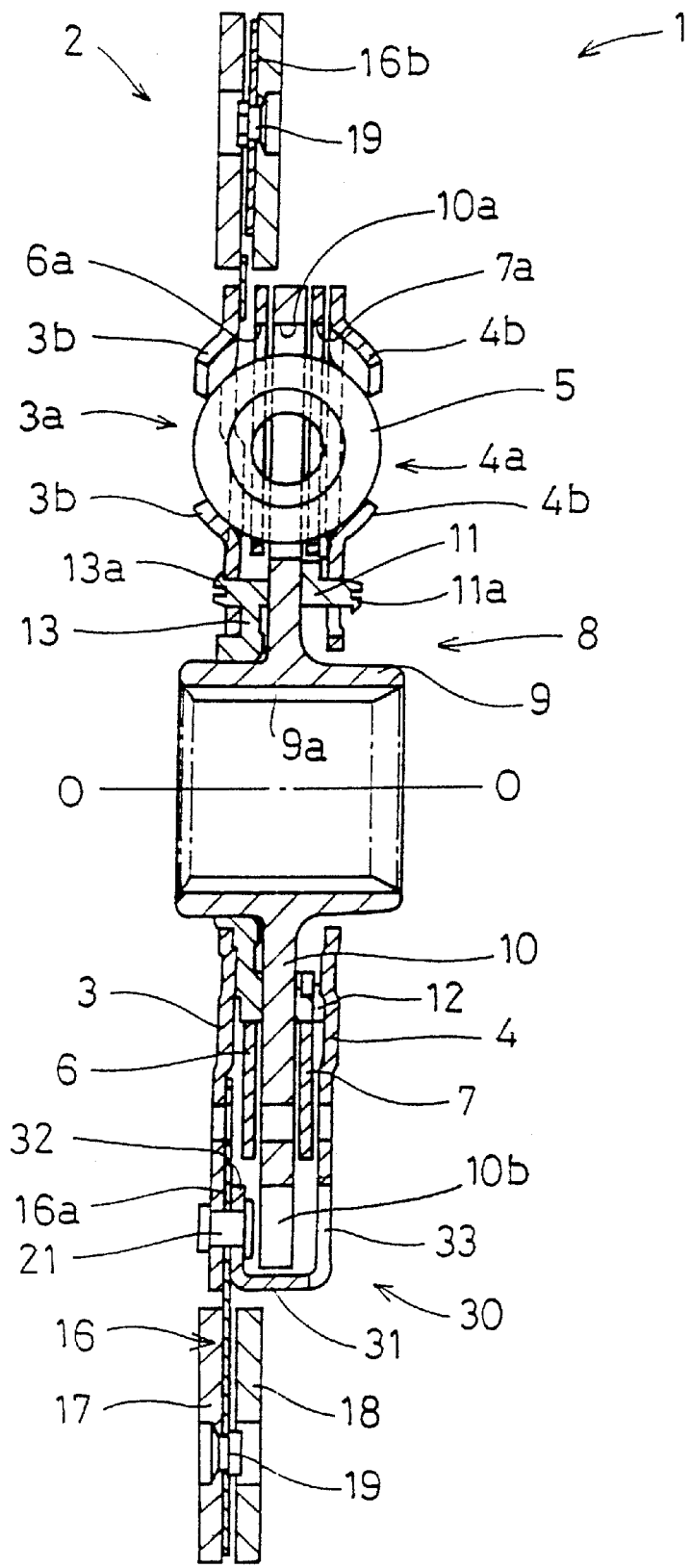
FIG. 1 is a cross sectional side view of a clutch disk assembly in accordance with a first embodiment of the present invention taken along the line I—I in FIG. 2.
Figure 2:
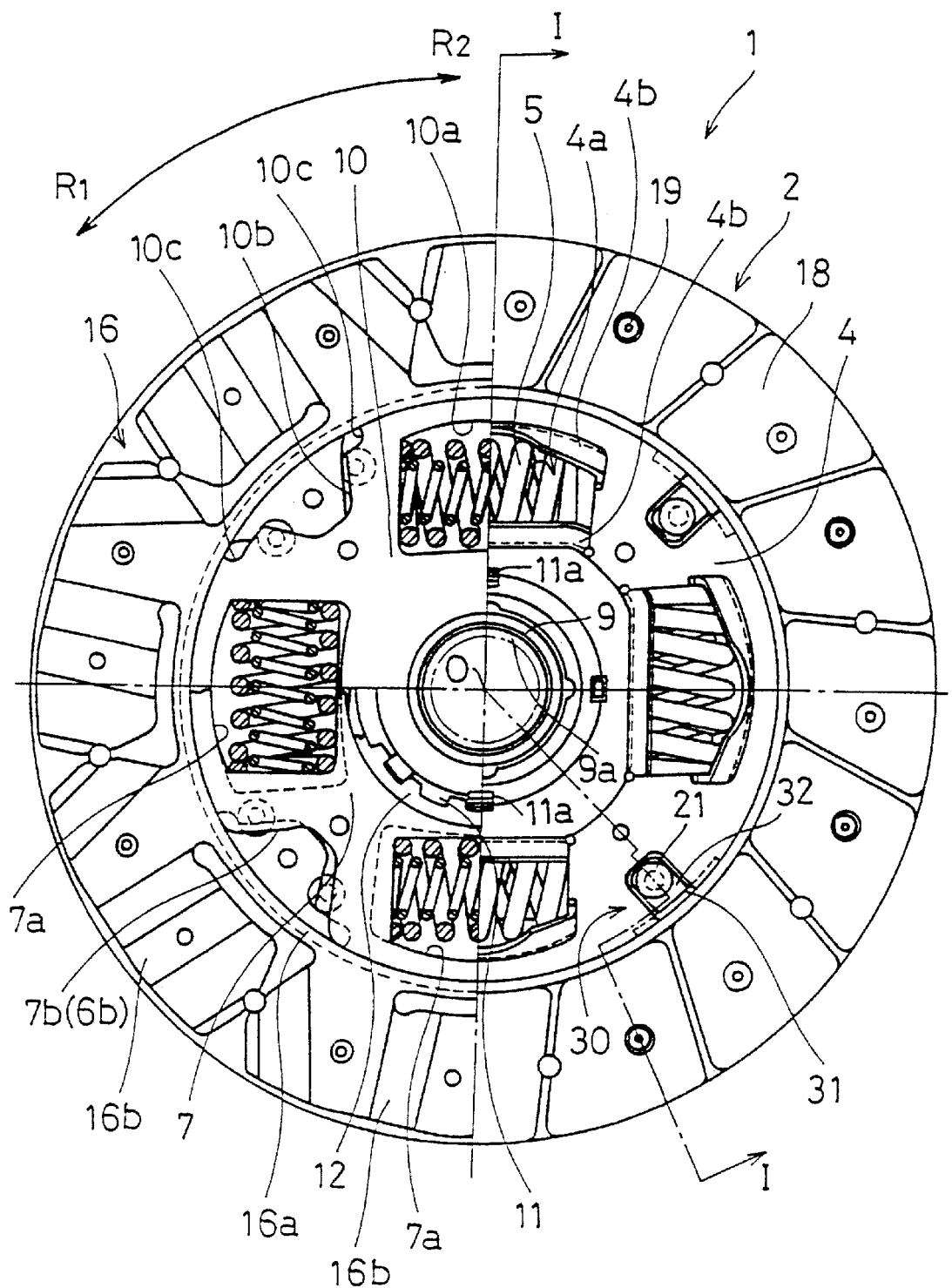
FIG. 2 is a partial cutaway, part cross section and part elevational view of the clutch disk assembly shown in FIG. 1.
Figure 3:
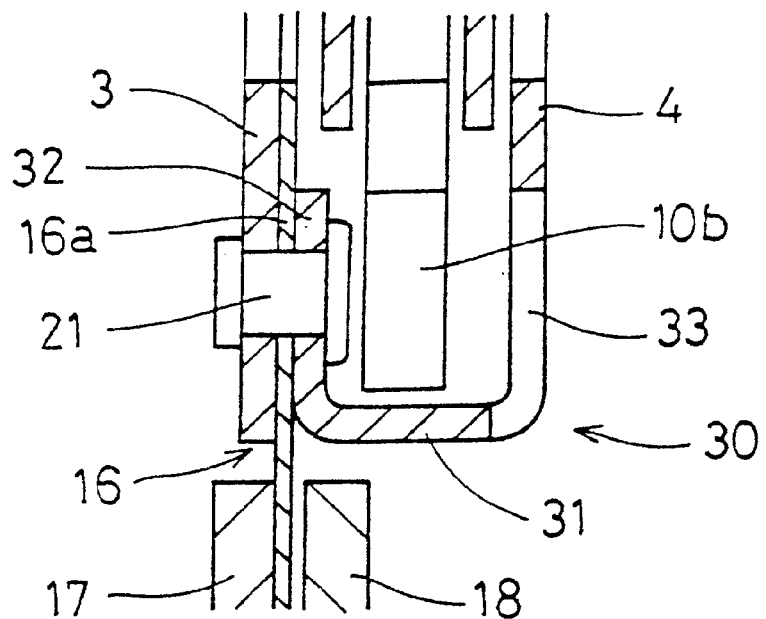
FIG. 3 is a fragmentary, cross sectional view of a portion of the clutch disk assembly depicted in FIG. 1, on a slightly enlarged scale.
Figure 4:
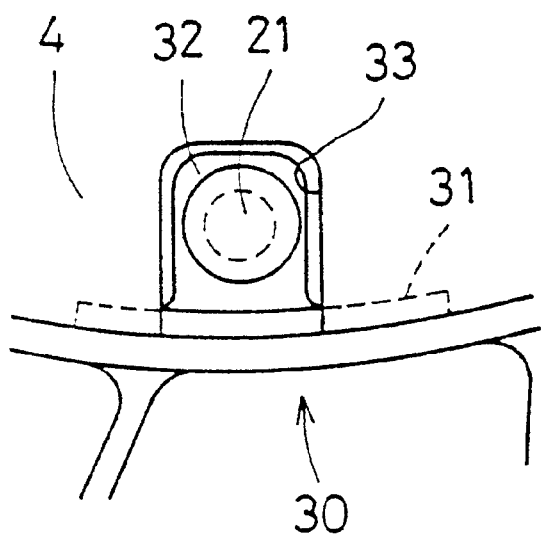
FIG. 4 is a fragmentary, elevational view of a portion of the clutch disk assembly depicted in FIGS. 1 and 2, on a slightly enlarged scale.

A clutch disk assembly 1 shown in FIGS. 1 and 2 is provided for selectively transmitting torque from a flywheel (not shown) of an engine to a transmission (not shown). In FIG. 1, line O—O represents a rotation axis of the clutch disk assembly 1. When installed in an automotive vehicle, the clutch disk assembly 1 is configured for installation with the engine (not shown) positioned to the left side of FIG. 1 and the transmission (not shown) positioned to the right side of FIG. 1. For convenience, henceforth the left side of FIG. 1 will be referred to as the engine side and the right side of FIG. 1 will be referred to as the transmission side.

The clutch disk assembly 1 includes, as major components, a frictional coupling portion 2, input plates which are specifically a clutch plate 3 and a retaining plate 4, coil springs 5, first and second intermediate plates 6 and 7, and a spline hub 8.

The frictional coupling portion 2 is adapted to be pressed against the flywheel (not shown). The frictional coupling portion 2 includes a cushioning plate 16, and first and second friction facings 17 and 18. The cushioning plate 16 is formed with an annular portion 16a and a plurality of cushioning portions 16b which are formed at the outer periphery of the annular portion 16a and are arranged in the circumferential direction. The annular portion 16a is fixed to the clutch and retaining plates 3 and 4 by four fixing rivets 21, as will be described in greater detail below. The first friction facing 17 at the engine side and the second friction facing 18 at the transmission side are fixed to the opposite surfaces of the cushioning portions 16b of the cushioning plate 16 by rivets 19, respectively.

Figure 5:
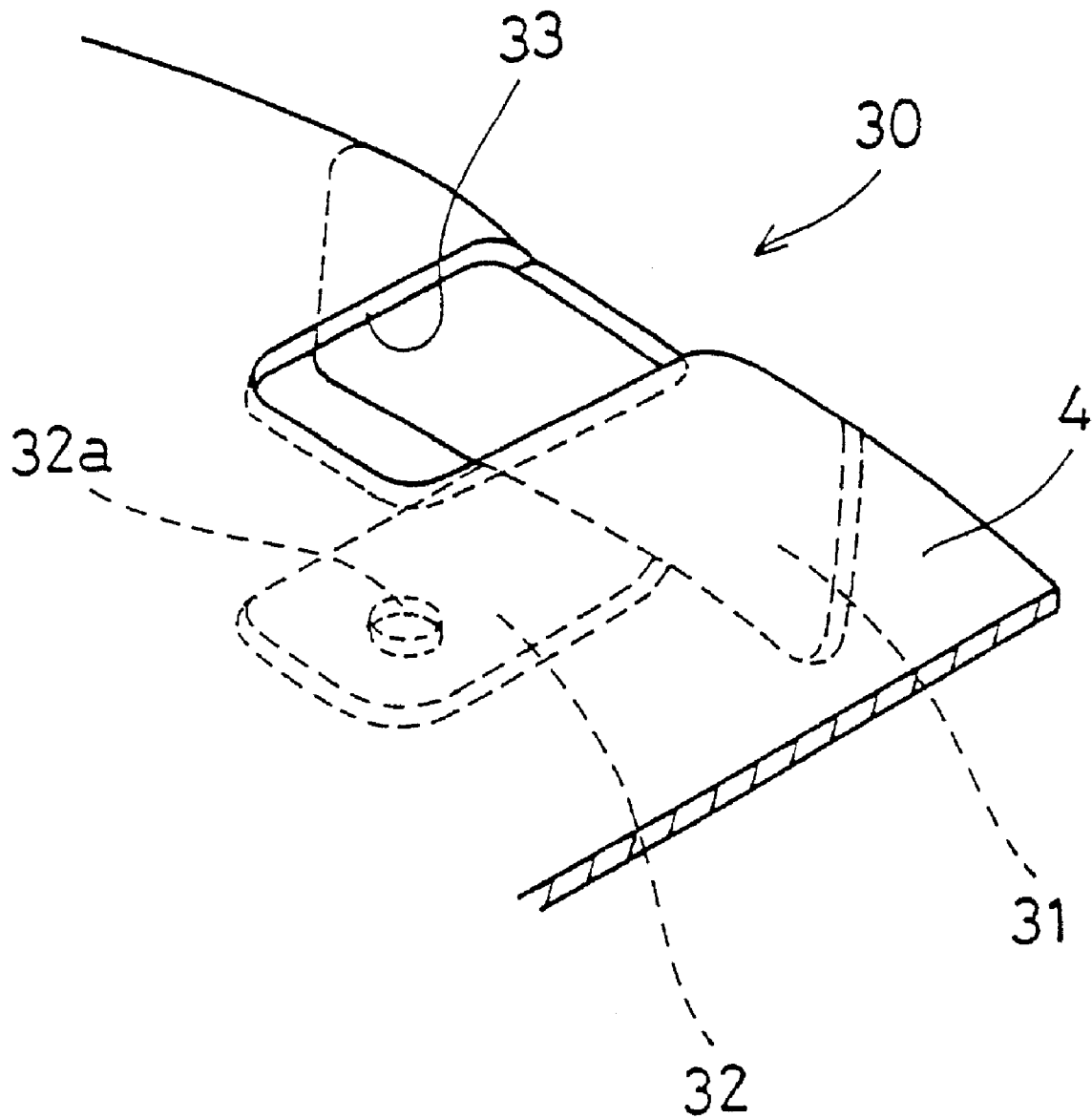
FIG. 5 is a perspective view of a portion of the clutch disk assembly depicted in FIGS. 1 and 2, showing a plate coupling portion of the clutch disk assembly.
Figure 6:
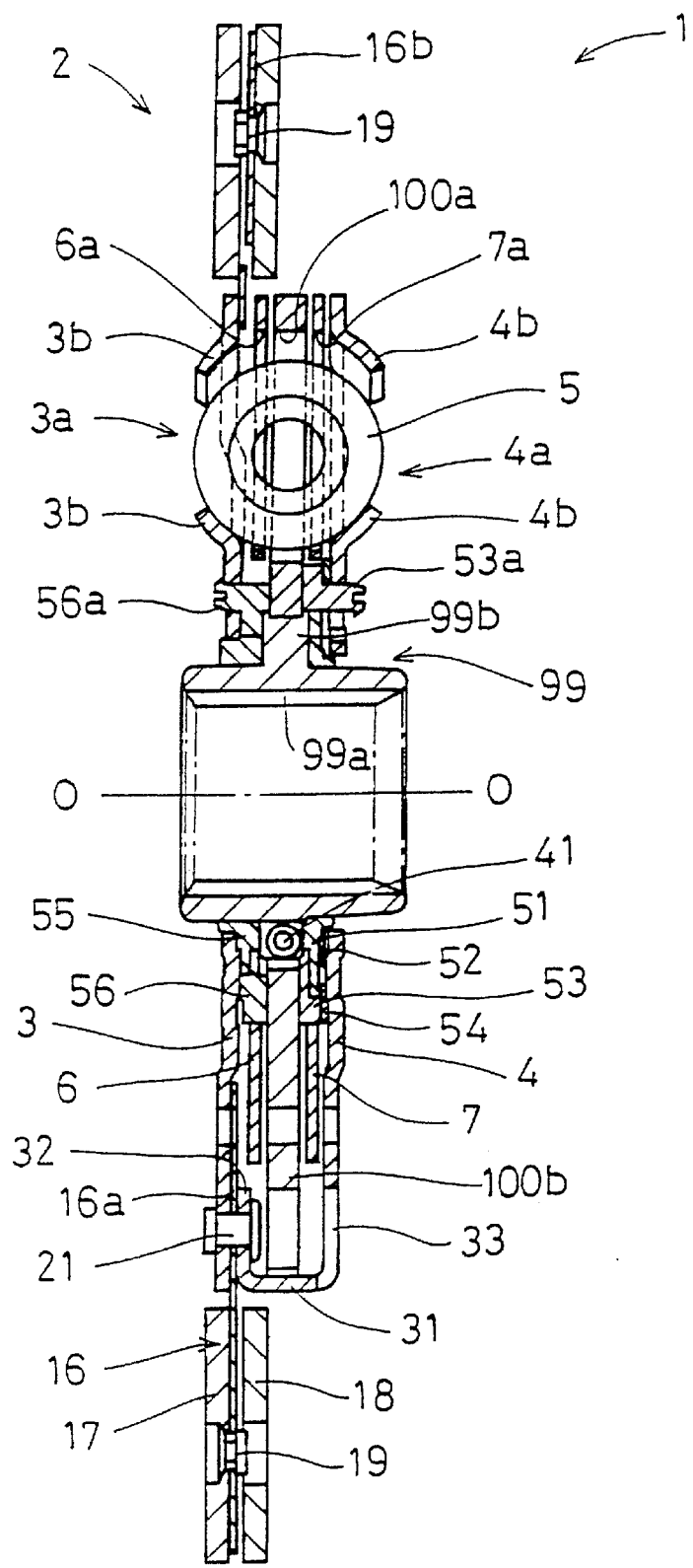
FIG. 6 is a cross sectional side view similar to FIG. 1, showing a clutch disk assembly in accordance with a second embodiment of the present invention taken along the line VI—VI in FIG. 7.

The clutch and retaining plates 3 and 4 are annular plate members, and are axially spaced from each other by a predetermined distance. The retaining plate 4 is provided at its outer periphery with four plate coupling portions 30 which are generally equally circumferentially spaced from each other. Each plate coupling portion 30 is generally formed with a stopper portion or extension 31 and fixing portion or a claw 32. Each extension 31 is formed unitarily with the retaining plate 4 as a single element, the extension 31 being bent at an outer periphery of the retaining plate 4 toward the clutch plate 3. The extension 31 has a predetermined circumferential width. The claw 32 extends radially inwardly from the extension 31, being bent radially inward from the extension 31. The claw 32 is in contact with the annular portion 16a of the cushioning plate 16. The claw 32 is provided with an aperture 32a into which the fixing rivet 21 is inserted. The claw 32 has a smaller circumferential width than the extension 31, as shown in FIG. 5. Each of the fixing rivets 21 extend through a corresponding aperture formed in the clutch plate 3, a corresponding aperture formed in the annular portion 16a of the cushioning plate 16 and one aperture 32a thus fixing the clutch plate 3, cushioning plate 16 and the claws 32 of the retaining plate 4 together.

The retaining plate 4 is provided with caulking apertures 33 at positions corresponding to the claws 32 to allow for insertion and deformation of the rivets 21 during assembly, as is described in greater detail below.

Each of the clutch and retaining plates 3 and plate 4 is provided at its radially outer portion with circumferentially equally spaced four openings or windows 3a or 4a. Each of the windows 3a and 4a is provided at its radially inner and outer edges with cut and bent portions 3b or 4b.

The spline hub 8 is arranged coaxially with the plates 3 and 4. The spline hub 8 includes an axially extending cylindrical boss 9 and a radial flange 10 extending integrally from the boss 9. The boss 9 is provided at its inner periphery with a spline aperture 9a fitted to a shaft (not shown) which extends from the transmission (not shown). The flange 10 has openings or windows 10a at positions corresponding to the windows 3a and 4a. The flange 10 is also provided at its outer periphery with four recesses 10b corresponding to the plate coupling portions 30. The flange 10 also has circumferentially extending contact concavities 10c which are located at circumferentially opposite portions of each recess 10b. The above described configuration is such that, compared to the prior art, allows for an increase in the maximum value of the relative rotation angle of the plates 3 and 4 with respect to the flange 10.

The first intermediate plate 6 is arranged between the clutch plate 3 and the flange 10. The second intermediate plate 7 is arranged between the flange 10 and the retaining plate 4. These plates 6 and 7 have outer diameters generally equal to those of the clutch and retaining plates 3 and 4, but have inner diameters larger than the inner diameter of the plates 3 and 4, as can be seen in FIG. 1. The first and second intermediate plates 6 and 7 have windows 6a and 7a at positions corresponding to the windows 3a, 4a and 1a, respectively. The openings 6a and 7a are circumferentially shorter than the windows 3a, 4a and 10a.

The coil springs 5 are arranged in the windows 3a, 4a, 6a, 7a and 10a. As can be seen from FIGS. 1 and 2, each coil spring 5 is actually defined by two coaxially arranged springs, one large coil spring and small coil springs. Each pair of coaxial coil springs will herein after be referred to as the coil spring 5 for simplicity. Circumferentially opposite ends of each coil spring 5 are in contact with the edges of the windows 3a and 4a and the edges of the windows 6a and 7a.

In FIG. 2, the four coil springs 5 are shown, one in a lower position, one on the left side, one in an upper position and one on the right side. The configuration of the coil springs 5 on the left and lower sides will now be described. It should be appreciated that the coil springs 5 in the upper and right sides are configured generally the same as the coil springs 5 in the lower and left sides. The left coil spring 5 is arranged such that the end at the R2 side, i.e., the end forming the forward end in the direction R2, is in contact with the edges of the windows 3a, 4a and 10a, and the end at the R1 side, i.e., the end forming the forward end in the direction R1, is spaced by a predetermined distance from the edges of the windows 3a, 4a and 10a. The lower coil spring 5 is arranged such that the end at the RI side is in contact with the edges of the windows 3a, 4a and 10a, and the end at the R2 side is spaced by a predetermined distance from the edge of the windows 3a, 4a and 10a. Thus, the end of the coil spring 5 in the left position adjacent to the coil spring 5 in the lower position is spaced from the edges of the windows 3a, 4a and 10a. Opposite ends of each coil spring 5 are in contact with the edges of the windows 6a and 7a of the first and second intermediate plates 6 and 7. In this manner, the left and lower coil springs 5 are arranged in series to couple the plates 3 and 4 to the flange 10 via the intermediate plates 6 and 7. The other set of the two coil springs 5 at the upper and right positions in FIG. 2 are arranged similarly to the above.

A first friction washer 11 is arranged between radially inner portions of the flange 10 and the retaining plate 4. The first friction washer 11 has an annular or circular potion which is in contact with the surface of the flange 10 facing the transmission side. The first friction washer 11 has engagement projections 11a for snap-fit. The engagement projections 11a are axially movable relative to the retaining plate 4 but are engaged with apertures formed at a radially inner portion of the retaining plate 4 such that the first friction washer 11 cannot rotate with respect to the retaining plate 4. A conical spring 12 is arranged between the circular portion of the first friction washer 11 and the retaining plate 4. the conical spring 12 thus arranged is axially compressed so that it axially biases the first friction washer 11 and the retaining plate 4 away from each other.

The second friction washer 13 is arranged between the radially inner portions of the clutch plate 3 and the flange 10. The second washer 13 is in contact with the flange 10 and the outer periphery of the boss 9. The second friction washer 13 has axially projected engagement projections 13a for snap-fit, which are axially movable with respect to the clutch plate 3 but are engaged in apertures formed at the radially inner portion of the clutch plate 3 such that the second friction washer 13 cannot rotate with respect to the clutch plate 3.

Operation of the clutch disk assembly 1 will be described below.

When the friction coupling portion 2 is coupled to the flywheel (not shown), a torque is transmitted from the flywheel to the spline hub 8 via the friction coupling portion 2, clutch and retaining plates 3 and 4, coil springs 5, first and second intermediate plates 6 and 7, and coil springs 5. The torque is further transmitted from the spline hub 8 to the shaft (not shown) extending from the transmission (not shown).

When a torsional vibration due to, e.g., variation in combustion of the engine is transmitted to the clutch disk assembly 1, the respective plates perform periodical relative rotation, so that the coil springs 5 are compressed, and the first and second friction washers 11 and 13 slide on the flange 10 to generate a hysteresis torque by producing friction.

Torsion characteristics will be described below. In the following description, it is assumed that the spline hub 8 is fixed to an appropriate stationary member, and the clutch and retaining plates 3 and 4 are rotated relatively to the spline hub 8.

In FIG. 2, the plates 3 and 4 are shown in a torsion free state. When the plates 3 and 4 are rotated in the direction R1 from the torsion free state, the edges of the windows 3a and 4a in the plates 3 and 4 push the left coil spring 5, which in turn pushes the lower coil spring 5 via the intermediate plates 6 and 7. The left coil spring 5 is compressed between the plates 3 and 4 and the intermediate plates 6 and 7. The lower coil spring 5 is compressed between the intermediate plates 6 and 7 and the flange 10. Thus, the left and lower coil springs 5 act in series. Simultaneously, the right and upper coil springs 5 act in series in a similar manner. This results in low-rigidity characteristics.

When the torsion angle increases, the end at the R1 side of the left coil spring 5 is brought into contact with the edge of the left window 10a in the flange 10, and the edges of the lower windows 3a and 4a are brought into contact with the end at the R2 side of the lower coil spring 5. Consequently, both the coil springs 5 are compressed in parallel between the edges of the windows 3a and 4a in the clutch and retaining plates 3 and 4 and the edge of the window 10a in the flange 10. This provides high-rigidity characteristics. During this operation, the first and second intermediate plates 6 and 7 do not make relative rotation.

When the torsion angle further increases to a predetermined amount, the extensions 31 of the plate coupling portions 30 are brought into contact with the contact concavities 10c of the recesses 10b formed at the flange 10. This stops relative rotation of the clutch and retaining plates 3 and 4 with respect to the spline hub 8.

The first embodiment described above and shown in FIGS. 1 through 5 does not employ conventional stop pins. Rather, the plate coupling portions 30 couple the clutch and retaining plates 3 and 4 together and restrict relative rotation of the plates 3 and 4 with respect to the flange 10. Therefore, the maximum relative torsion angle can be larger than that in the prior art where stop pins are employed. In particular, the extension 31 can be radially shorter than the conventional stop pin, which can further increase the maximum relative torsion angle.

An assembly operation of the clutch disk assembly 1 will be described below. First, the spline hub 9, cushioning plate 16, first and second intermediate plates 6 and 7 and others are arranged on the clutch plate 3, and the retaining plate 4 is arranged with respect to them on the clutch plate 3. In this operation, the apertures 32a in the claws 32 of the retaining plate 4 are aligned to the apertures in the clutch plate 3 and the retaining plate 16. In this state, the fixing rivets 21 are inserted into the connection apertures from the clutch plate side. Dies for rivet caulking are inserted into caulking apertures 33 formed at the retaining plate 4 and the recesses 10b at the flange 10, and deforms heads of the fixing rivets 21. In this manner, the clutch and retaining plates 3 and 4 are coupled together, and the cushioning plate 16 is fixed to the radially outer portion of the plates 3 and 4.

The plate coupling portion described above is formed with an extension and claw extending integrally from the clutch plate. Alternatively, the plate coupling portion may be made of a separate member, independent of the clutch and retaining plates.

Second Embodiment

In the first embodiment described above, the boss of the spline hub is integral with the flange. In contrast to the first embodiment, a second embodiment is also within the scope of the present invention. The second embodiment has virtually all of the elements of the first embodiment above except that a spline hub is formed as a separate member from a flange. Further, an elastic member arrange between the spline hub and the flange. This structure further increases the maximum value of the total torsion displacement angle, and can provide lower-rigidity characteristics at the first stage in the relative rotation operation. Below, only the structure and operation of the second embodiment which differs from the first embodiment will be described, and similar structure and operation will not be described.

The boss 99 is an axially extending cylindrical member, and has a spline aperture 99a fitted to the shaft (not shown) extending from the unillustrated transmission. The boss 99 is integrally provided at its outer periphery with a flange 99b. The flange 99b has a plurality of outer teeth 99c projected radially outward. The separate flange 100 is provided at its inner periphery with a plurality of inner teeth 100d, each of which is located between the adjacent outer teeth 99c. A circumferential space is defined between the teeth 100d and 99c neighboring to each other. The flange 99b is provided with a circumferentially long recess 99d, and the separate flange 100 is provided with a recess 100e at the position corresponding to the recess 99d. A small coil spring 41 is arranged in the recesses 99d and 100e.

A first friction washer 51 and a first conical spring 52 are arranged between the flange 99b and a radially inner portion of the retaining plate 4. The first friction washer 51 is in contact with the flange 9b, and the first conical spring 52 is axially compressed between the first friction washer 51 and the retaining plate 4.

A second friction washer 53 and a second conical spring 54 are arranged between the separate flange 100 and the retaining plate 4. The second friction washer 53 is in contact with the separate flange 100, and the second conical spring 54 is axially compressed between the second friction washer 53 and the retaining plate 4. The second friction washer 53 has a plurality of engagement projections 53a for snap-fit projected toward the transmission. The second friction washer 53 is axially movable with respect to the retaining plate 4 but cannot rotate with respect to the retaining plate 4 because the projections 53a are engaged with apertures formed at the radially inner portion of the retaining plate 4. Similarly, the first friction washer 51 is axially movable but is engaged with the second friction washer 53 so that the first and second friction washers 51 and 53 rotate together with the retaining plate 4.

A third friction washer 55 is arranged between the flange 99b and the radially inner portion of the clutch plate 3. A fourth friction washer 56 is arranged between radially inner portions of the separate flange 100 and the clutch plate 3. The third friction washer 55 is in contact with the flange 99b, and is engaged with the clutch plate 3 such that it may not rotate with respect thereto. The fourth friction washer 56 is in contact with the separate flange 100 and the clutch plate 3. The fourth friction washer 56 is provided with a plurality of engagement projections 56a projected toward the engine. The engagement projections 56a are axially movably but are engaged with the clutch plate 3 such that the fourth friction washer 56 may not rotate with respect to the clutch plate 3. The third and fourth friction washers 55 and 56 are engaged with each other such that they may not rotate with respect to one another.

In this embodiment, only the small coil spring 41 having the lowest rigidity is compressed when the torsion angle is small. In this operation, only the first and second friction washers 51 and 53 frictionally slide on the flange 99b, so that a low hysteresis torque is generated.

Third Embodiment

Figure 7:
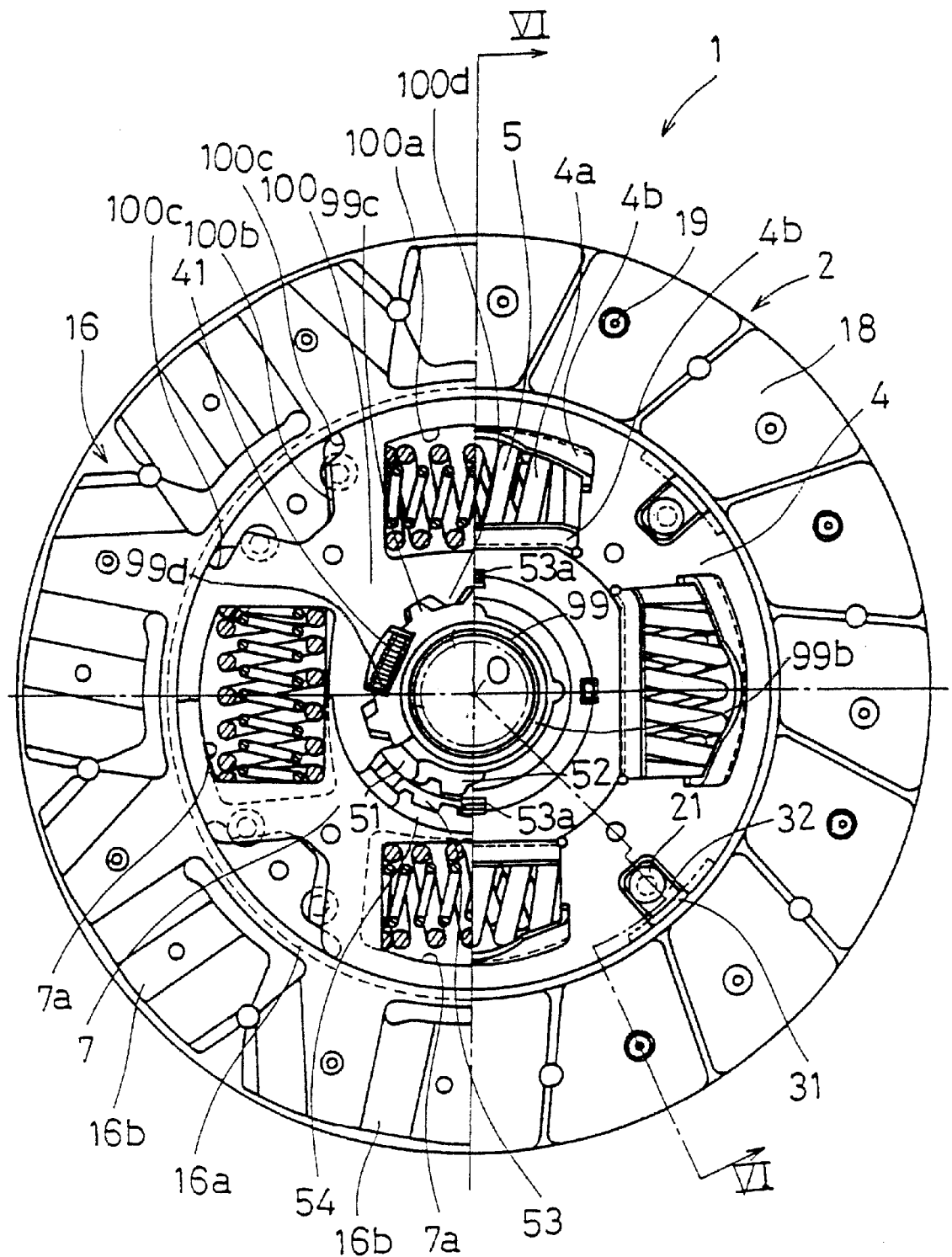
FIG. 7 is a part cutaway, part elevation of the clutch disk assembly in accordance with the second embodiment depicted in FIG. 6.
Figure 7A:
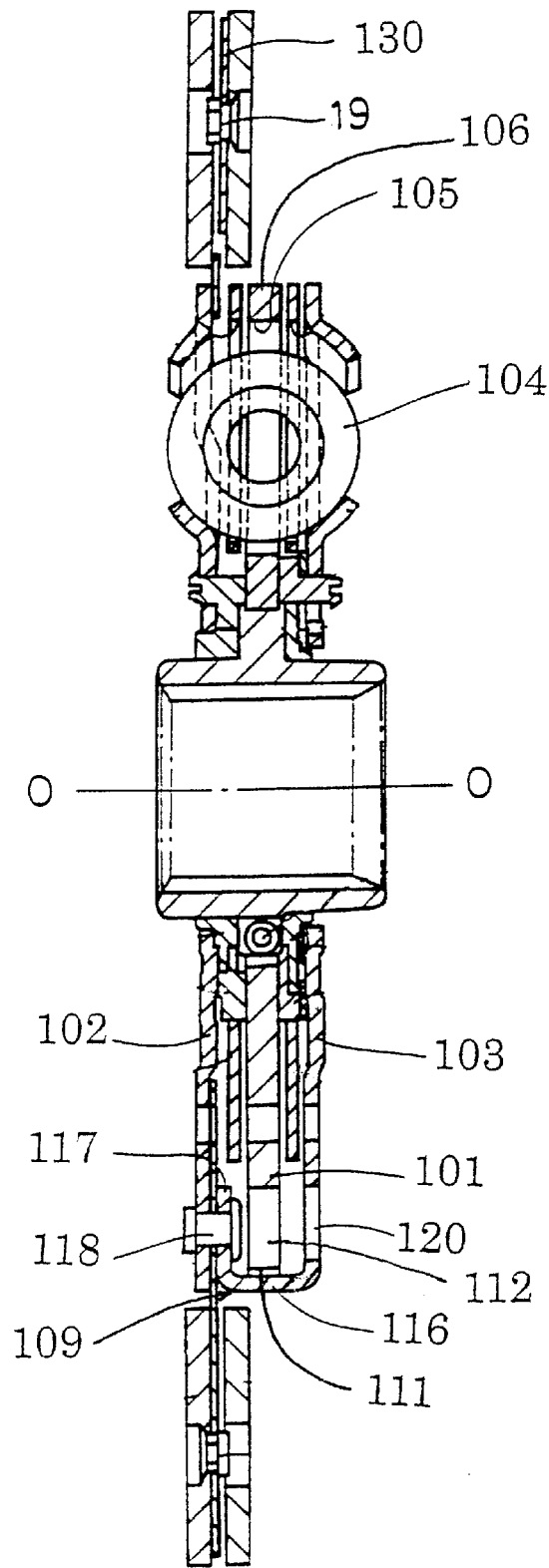
FIG. 7A is a cross sectional side view of a clutch disk assembly in accordance with a third embodiment.
Figure 8:
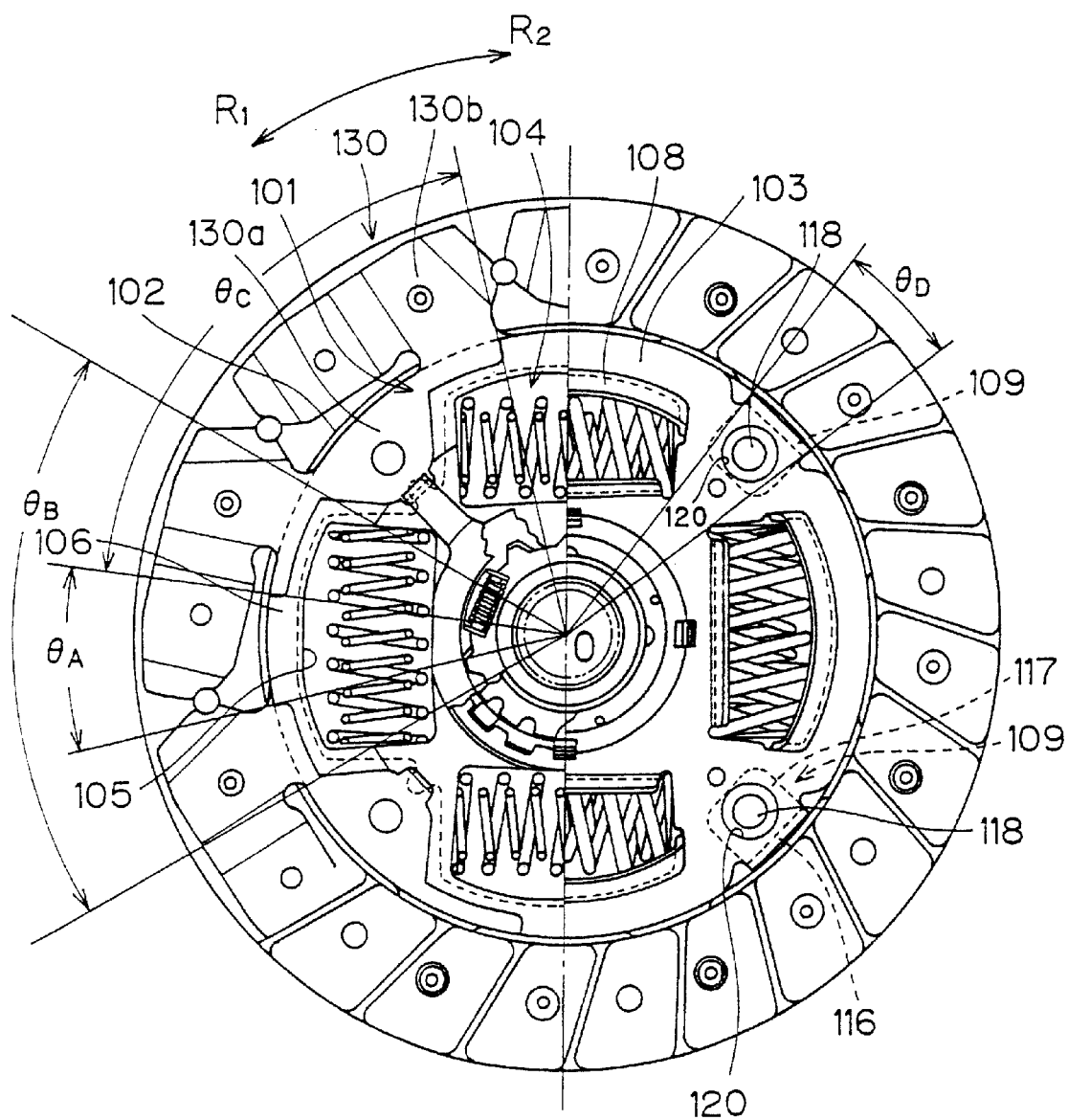
FIG. 8 is a part cutaway, part elevation of the clutch disk assembly shown in FIG. 7A.

FIGS. 7A and 8 show a clutch disk assembly of a third embodiment of the invention. The clutch disk assembly has a clutch function for connection and disconnection with respect to the flywheel of the engine, and also has a damper function for absorbing or damping a torque vibration transmitted from the engine. In FIG. 8, the arrow R1 indicates a rotating direction of the clutch disk assembly, and the arrow R2 indicates the reverse direction. A line O—O in FIG. 7A and a point O in FIG. 8 represent a rotation axis, i.e., a rotation center of the clutch disk assembly.

The clutch disk assembly of the third embodiment has virtually all of the elements of the second embodiment except that a plate coupling poriton is different.

The clutch disk assembly has a hub flange 101 forming a first rotary plate, a clutch plate 102 forming a second rotary plate, a retaining plate 103 forming a third rotary plate and coil springs 104, i.e., elastic members.

Figure 13:
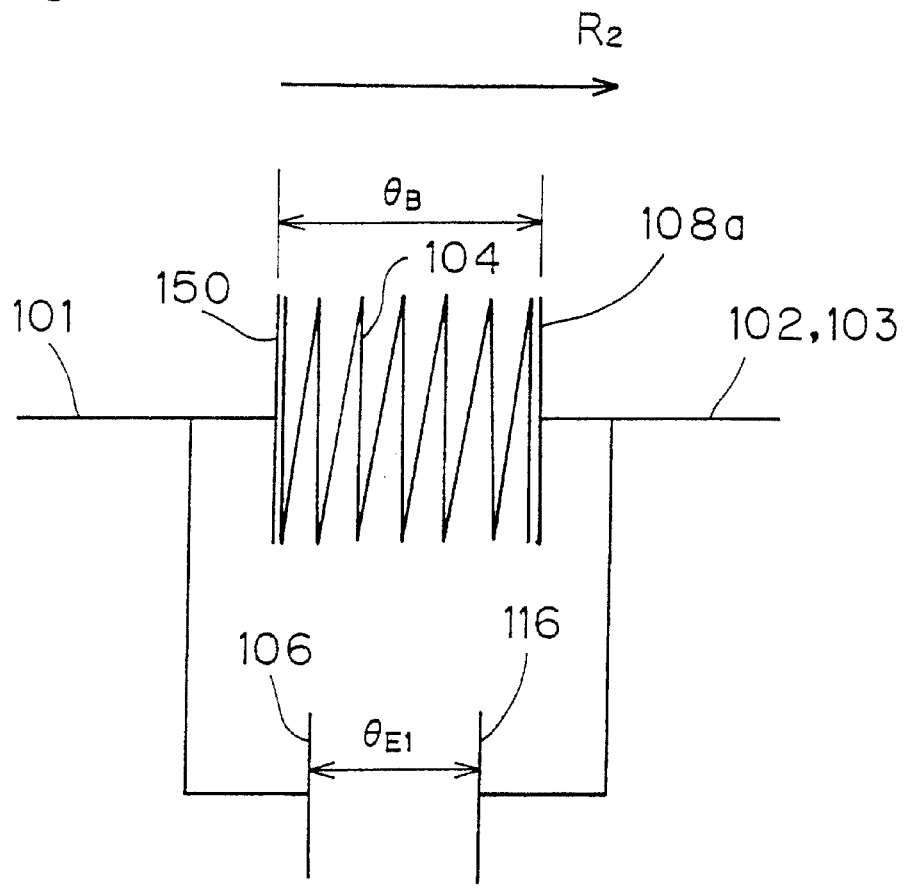
FIG. 13 is a mechanical circuit diagram of the damper mechanism.

A specific description will now be given of the damper mechanism which includes the hub flange 101 forming an output member, the clutch and retaining plates 102 and 103 forming the input members, and the coil springs 104, i.e., the elastic members for elastically and circumferentially coupling the input and output members together. The other structures will not be described below since they are similar or the same as those described above with respect to the first and second embodiments. FIG. 13 is a diagram showing a mechanical circuit of the damper mechanism. This mechanical circuit diagram schematically shows the damper mechanism, and more specifically illustrates an operation of various parts and a relationship between them in such a case that the hub flange 101 rotates in one circumferential direction (e.g., direction R2) with respect to the plates 102 and 103.

The hub flange 101 is a plate-like member, and is made of a material such as cast iron. The hub flange 101 has a circular or annular form. The hub flange 101 is coupled at its radially inner portion to a boss through small coil springs (similar to the configuration described above with respect to the second embodiment). The invention may be applied to a structure employing a hub flange which is integrally formed around a boss (similar to configuration described above with respect to the first embodiment).

The hub flange 101 is provided with four windows 105 which are circumferentially equally spaced from each other, and each have a circumferentially long length. An edge of each window 105 is formed of contact portions 150 at circumferentially opposite ends, an outer peripheral portion 151 at the radially outer position and an inner peripheral portion 152 at the radially inner position, as shown more clearly in FIGS. 9 and 10. The circumferential sides of the outer peripheral portion 151 of each window 105 has an arcuate shape which confines the radial outer side of the window 105. The window 105 may be partially opened radially outward. The hub flange 101 is provided at positions circumferentially between the windows 105 with cutaways 112. Each of the cutaways 112 is defined at a radially outer portion of the hub flange 101 by stopper surfaces 111. The cutaways 112 are further defined at inner radial portions thereof by edge surfaces 113. Together, the stopper surfaces 111 and the edge surfaces 113 define diverging cutaways 112.

A plurality of projections 106 are formed on the hub flange 101, each projection 106 being positioned on a radially outer edge of the hub flange 101 adjacent to a corresponding window 105. Thus, the projection 106 projects radially outward further from an outer periphery 157 of the hub flange 101. Each projection 106 has a circumferential length defined by an angle $\theta_A$, and is defined at circumferentially opposite ends by stopper surfaces 111, respectively. Each projection 106 is circumferentially shorter than the window 105, as can be observed in FIGS. 8 and 10, and is positioned radially outward from a circumferential center of the window 105. In the circumferential direction, therefore, each stopper surface 111 of a projection 106 is circumferentially spaced away from the adjacent edge surface 113 of the adjacent cutaway 112 than the adjacent contact portion 150 of the adjacent window 105. Each of the projections 106 is defined circumferentially by the stopper surfaces 111 in this embodiment, but may alternatively be formed with open circumferential mid-portions such that the windows 105 are open at a radially outward edge of the hub flange 101. In the modification, each projection 106 may alternatively be formed as two circumferentially spaced portions, each of such portions defining one of the stopper surfaces.

The structure of the hub flange 101 is described below from a different perspective. The hub flange 101 is provided at a radially inner side with an annular portion, and also has a plurality of projecting portions 153 extending radially outward from the annular portion. There are four projecting portions 153 in number which are circumferentially equally spaced from each other. Each projecting portion 153 is circumferentially long, and each is provided with one window 105. Each window 105 occupies about 70% of the total area of the projecting portion 153.

The projecting portions 153 can also be described as follows. Each projecting portion 153 is formed of two circumferential end frame portions 154 extending substantially in a radial outward direction, and an outer peripheral frame portion 155 which connects the radially outer ends of the circumferential end frame portions 154 together. The circumferential end frame portions 154 define the contact portions 150 at the circumferential inner side of the windows 105, and also forms the edge surfaces 113 at the circumferentially other side. The outer peripheral frame portions 155 define the outer peripheral portions 151 at the radially inner side, and define the outer peripheries 157 at the radially outer side. The projections 106 are defined along the outer peripheries 157. Each recess 112, described above, is formed in the space between the end frame portions 154 of the circumferentially adjacent projecting portions 153.

The clutch plate 102 is a circular plate member disposed at a first axial side (i.e., a side near the engine) of the hub flange 101. The clutch plate 102 is a plate member formed by press working, and has a smaller thickness (axial length) than the hub flange 101. The clutch plate 102 is similar to the clutch plate 3 described above with respect to the first embodiment. The clutch plate 102 is also similar to the retaining plate 103 (described below and depicted in FIG. 11). The clutch plate 102 has first supports 107 corresponding to the windows 105 of the hub flange 101, respectively. The first supports 107 are generally the same in shape and size to corresponding portions, second supports 108, formed on the retaining plate 103 depicted in FIG. 11. Each first support 107 is defined by an opening formed correspondingly to the window 105, and has contact surfaces 107 for circumferentially supporting the opposite ends of the coil springs 104, and cut and bent portions 107 for restricting radial and axial movements of the coil springs 104. The cut and bent portions 107 are formed at radially inner and outer sides of each opening.

The retaining plate 103 is arranged at a second axial side (i.e., a side near the transmission) with respect to the hub flange 101, and has the substantially same structure as the clutch plate 102. Thus, the retaining plate 103, depicted in FIG. 11, has second supports 108 corresponding to the windows 105, respectively, and each support 108 has contact surfaces 108a and cut and bent portions 108b.

Figure 11:
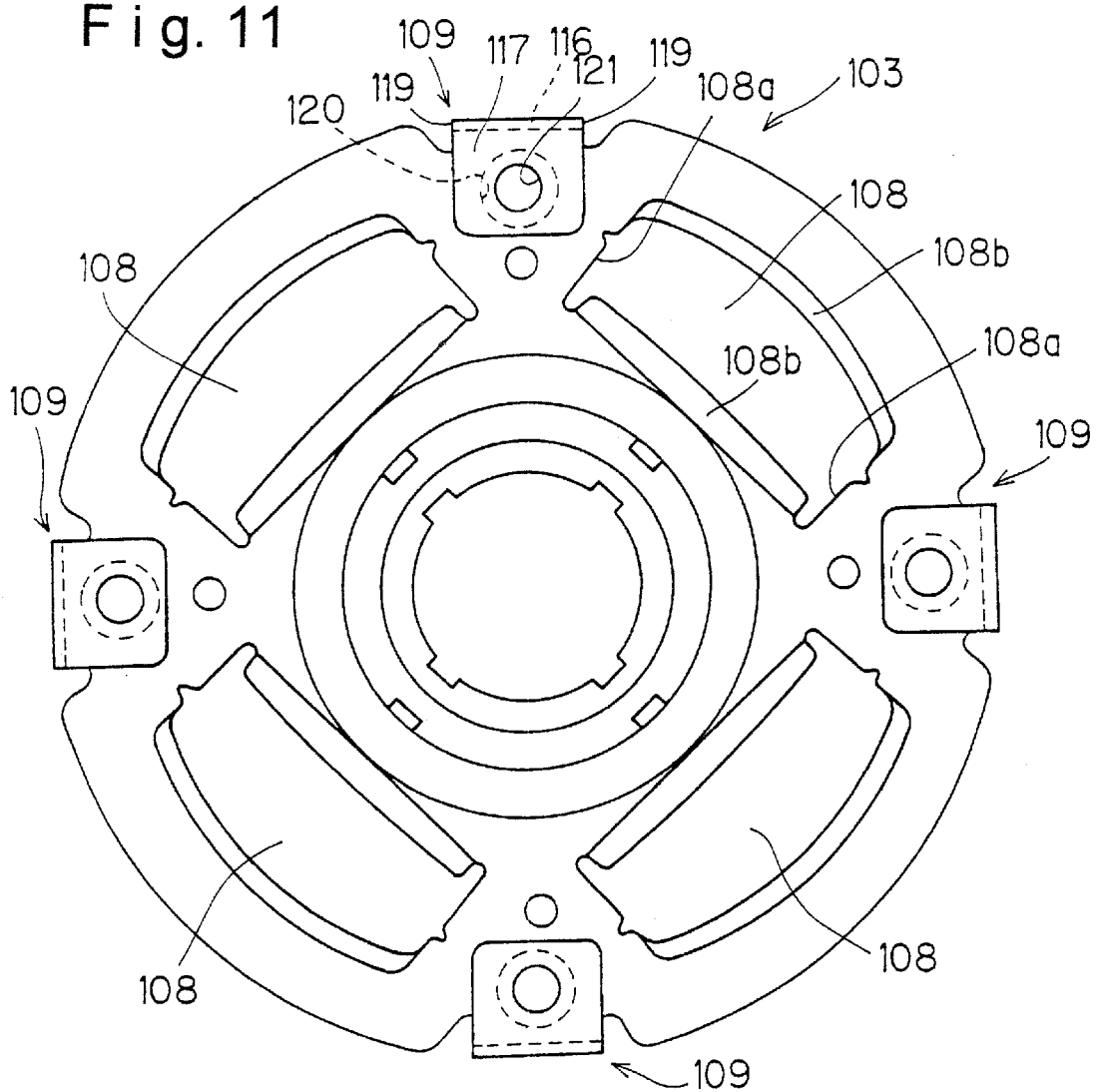
FIG. 11 is a rear view of a retaining plate of the clutch disk assembly, the plate coupling portion being formed on the retaining plate.
Figure 12:
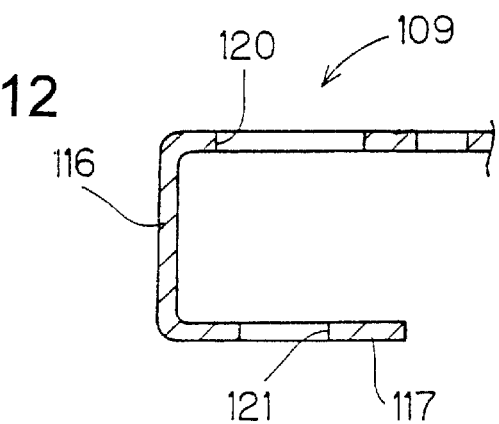
FIG. 12 is a cross section of the plate coupling portion.

Further, the retaining plate 103 has a plurality of plate coupling portions 109 as shown in FIG. 11. Each plate coupling portion 109 is provided for coupling the clutch and retaining plates 102 and 103 together, and also forms a portion of a stopper mechanism in the clutch disk assembly as is described below. The plate coupling portions 109 are integral with the retaining plate 103, and has a predetermined circumferential width. As shown in FIG. 11, each plate coupling portion 109 is located circumferentially between the second supports 108, as shown in FIG. 11. Each coupling portion 109 is specifically formed of a stopper portion 116 extending axially from the outer periphery of the retaining plate 103, and a fixing portion 117 extending radially inward from the end of the stopper portion 116. The stopper portion 116 has stopper surfaces 119 at its circumferentially opposite sides. Since the stopper portion 116 has a plate-like form, it has a small radial length corresponding only to a thickness of the sheet metal. The radial length $r_1$ of the stopper portion 116 is equal to the thickness of the retaining plate 103, as seen in FIG. 7A. The fixing portion 117 extends radially inward to a position circumferentially between the second supports 108. The fixing portion 117 is parallel and in contact with the outer peripheral portion of the clutch plate 102. The fixing portion 117 has an aperture 121 into which a rivet 118 is inserted. The rivet 118 rigidly couples the fixing portion 117, the clutch plate 102 and a cushioning plate 130.

As shown in FIG. 8, the cushioning plate 130 is formed of an annular fixing portion 130a coupled to the plates 102 and 103 by the rivets 118, and cushioning portions 130b extending radially outward from the fixing portion 130a. As described above, the cushioning plate 130 has an annular form as a whole, and is coupled at a small number of, i.e., four portions to the plates 102 and 103. The retaining plate 103 is provided at positions corresponding to the apertures 121 with apertures 120 having larger diameters than the apertures 121, respectively. The apertures 120 are provided for caulking the head of the rivets 118.

According to the structure described above, the clutch plate 102 and the retaining plate 103 are arranged on axially opposite sides of the hub flange 101, and are fixed together by the plurality of coupling portions 109.

The coil springs 104 are elastic members used in the damper mechanism of the clutch disk assembly. Each coil spring 104 is formed of a pair of coaxial coil spring components. The coil springs 104 are accommodated in the windows 105 and the first and second supports 108. Each coil spring 104 extends in the circumferential direction through a substantially entire area of the window 105. Thus, the coil spring 104 extends circumferentially through an angle substantially equal to a circumferential angle $\theta_B$ of the window 105 which is described below. The circumferentially opposite ends of each coil spring 104 are circumferentially engagable with the contact portions 150 of the window 105 and the contact surfaces 107a and 108a of the first and second supports 107 and 108. Thus, the circumferentially opposite ends of each coil spring 104 are in contact with or can come into contact with the contact portions 150 and the contact surfaces 107a and 108a. The torque of the plates 102 and 103 is transmitted to the hub flange 101 through the coil springs 104. When the plates 102 and 103 rotate relatively to the hub flange 101, the coil springs 104 are compressed between them. More specifically, each coil spring 104 is circumferentially compressed between a pair of contact surfaces 107 and 108a and a contact portion 150 which are located at circumferentially opposite sides. In a free or initial state that no torsion is present between the hub flange 101 and the plates 102 and 103, the radially inner portion of each end of the coil spring 104 is in contact with or close to the contact portion 150, but the radially outer portion thereof is slightly spaced from the contact portion 150.

Figure 9:
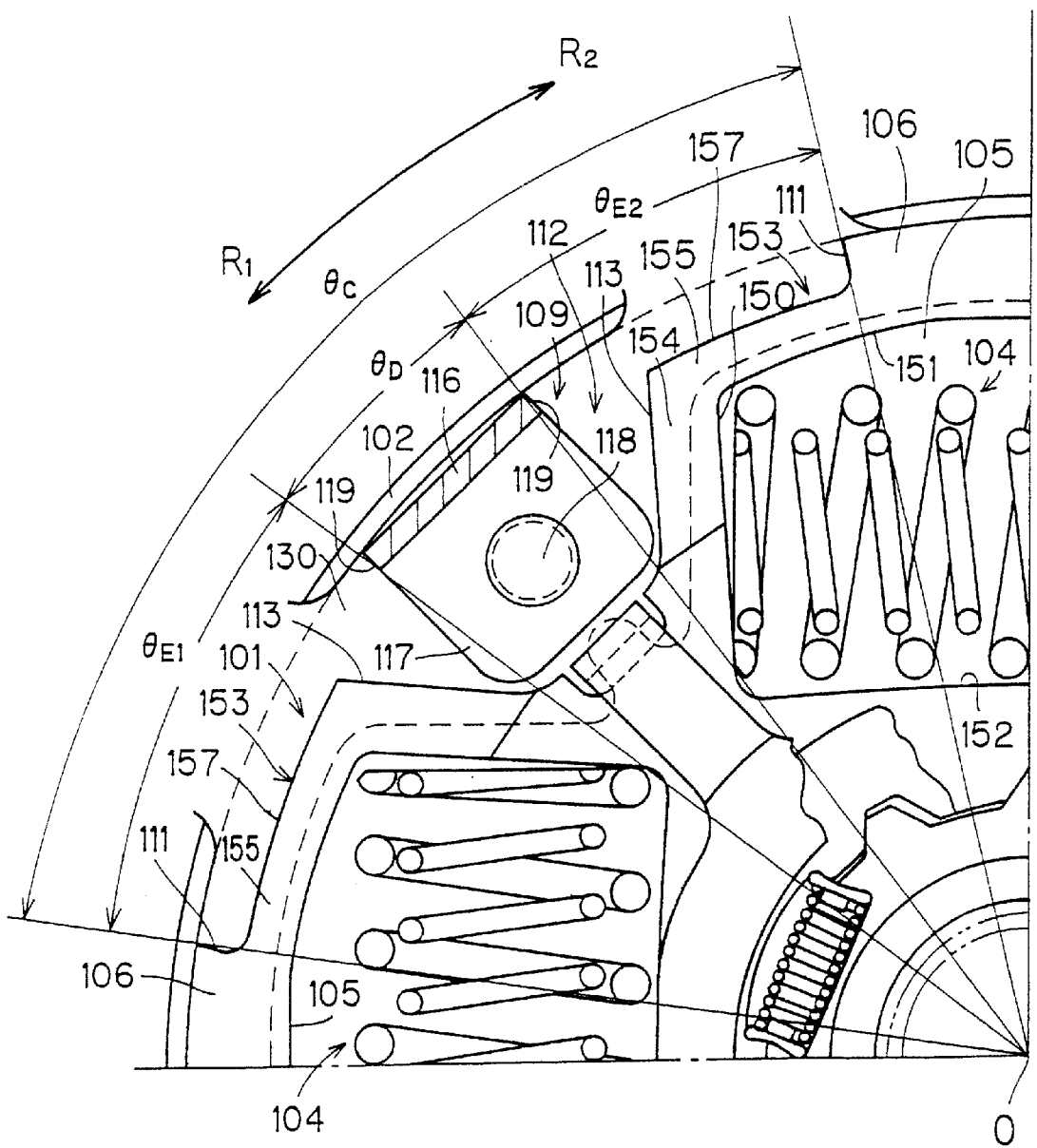
FIG. 9 is a cutaway showing the plate coupling portion of a damper mechanism of the clutch disk assembly depicted in FIG. 8, on a slightly enlarged scale, with other portions of the damper mechanism.

Description is now provided for the stopper mechanism which is defined by the stopper portions 116 of the coupling portions 109 and the projections 106. In FIG. 9, the coupling portion 109 is located at a position circumferentially between the windows 150, within the recess 112 and circumferentially between the projections 106. The stopper portion 116 of the coupling portion 109 is located at a position which is radially outside the outer peripheries 157 of the hub flange 101. Thus, the stopper portion 116 and the projections 106 are located at the substantially same radial positions. Therefore, the stopper portion 116 and the projections 106 can contact each other in response to a large, predetermined torsion angle of rotary displacement between the hub flange 101 and the plates 102 and 103. More specifically, one of the stopper surfaces 119 of the stopper portion 116 can come into contact with a stopper surface 111 of a projection 106. When they are in contact with each other, the stopper portion 116 is located circumferentially within the range of the projecting portion 153 or the window 105 but radially outside the projecting portion 153. Thus, the stopper portion 116 can move to a position circumferentially within the range of the projecting portion 153 or the window 105.

An advantage of the stopper mechanism described above will now be described below. Since the stopper portions 116 have a plate-like form, length relative to their circumferential length can be shorter than that of a stop pin in the prior art. Stop pins of the prior art are typically positioned more radially inward than the position of the stopper portion 116 of the present invention. Further, the radial length of the stopper portion 116 is equal to the thickness of the retaining plate 103. This means that the substantial radial length of the stopper mechanism is as short as the thickness of the sheet metal from which the retaining plate 103 is formed.

The stopper portions 116 are disposed at the outer peripheries, i.e., the radially outermost position of the clutch and retaining plates 102 and 103, and also located at the position radially outside the projecting portions 153 and particularly the outer peripheries 157. Since the stopper portions 116 are located outside the windows 105, no interference occurs between the stopper portions 116 and the windows 105. As a result, it is possible to increase both the maximum allowable torsion angle of the damper mechanism and the maximum allowable torsion angle of the coil springs 104. If the stopper portions and the windows were located at approximately the same radial position, the torsion angle of the damper mechanism and the circumferential angle of the windows should be much smaller than the angles of the third embodiment.

In particular, since the radial length of the stopper mechanism is much shorter than the diameter of a conventional stop pin made of a rivet, provision of the stopper mechanism radially outside the window 105 does not remarkably increase the diameters of the clutch and retaining plates 102 and 103. Also, the radial length of the window 105 is not reduced by the configuration of the stopper mechanism, as compared to the prior art using rivets.

Angles of the various structures and relationships between them will now be described more in detail.

The term "circumferential angle" in the following description means rotational angle of the clutch disk assembly. The values of the angles, which will be used in the following description, are merely examples for the clutch disk assembly of the third embodiment, and the invention is not limited to these values.

Figure 10:
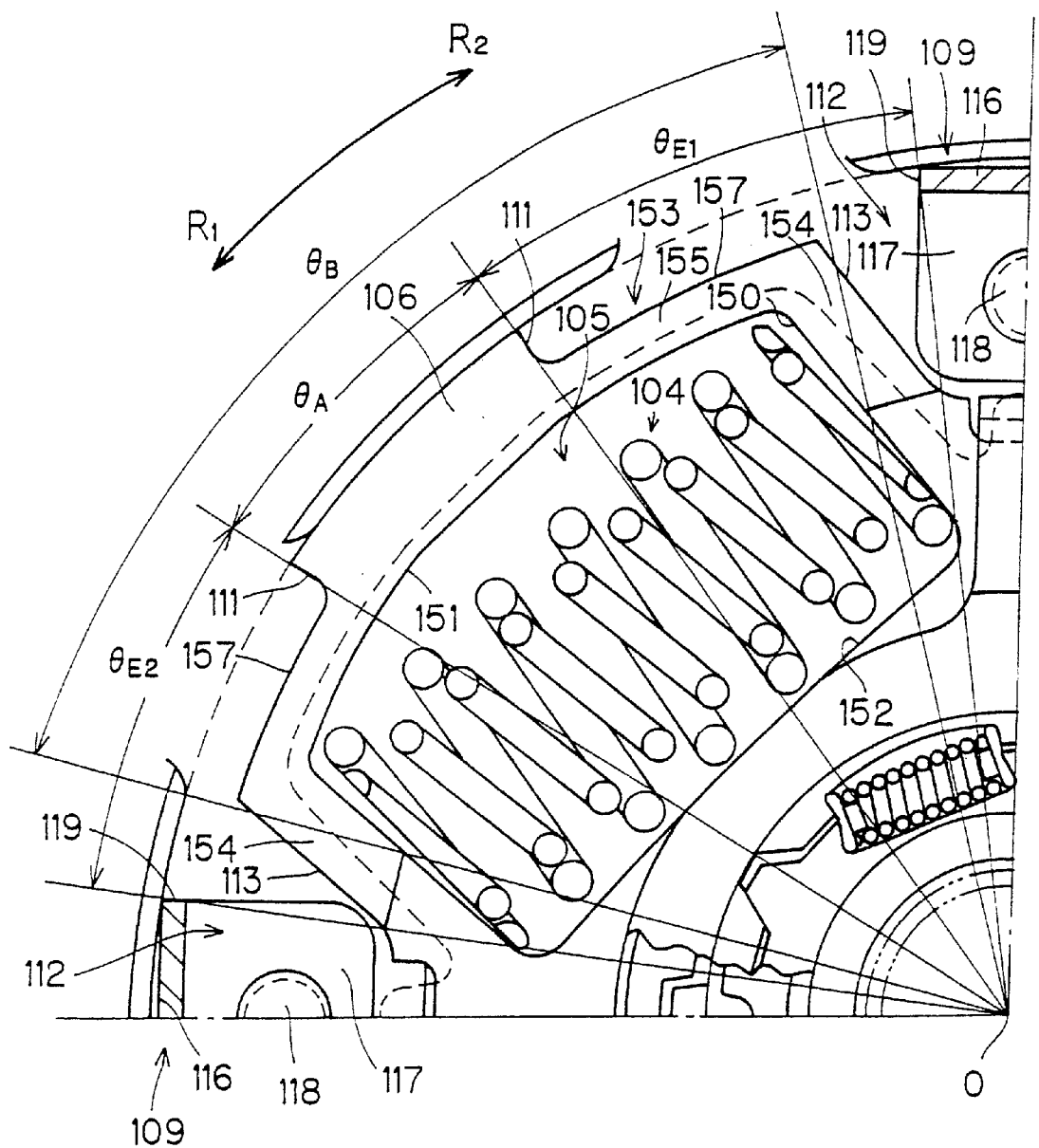
FIG. 10 is a cutaway view showing areas around the plate coupling portion of the damper mechanism, looking at the clutch disk assembly rotated approximately 45° from the position depicted in FIG. 9.
Figure 14:
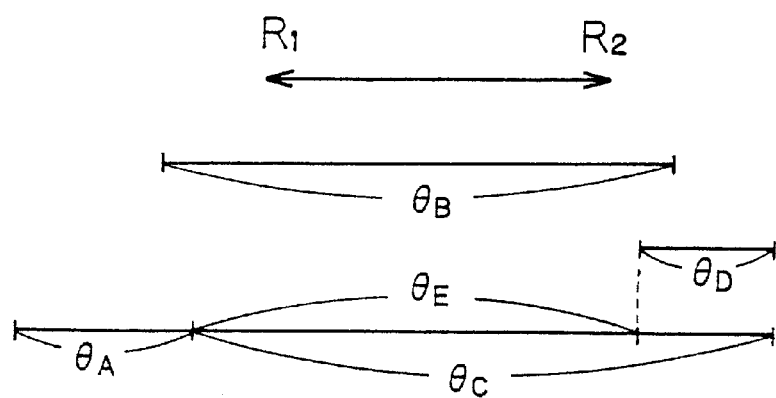
FIG. 14 is a diagram showing relationships between torsion angles of the damper mechanism.

Various circumferential angles $\theta_A$, $\theta_B$, $\theta_C$, $\theta_D$ and $\theta_E$ are defined as shown in FIGS. 8 to 10. FIG. 14 is a diagram showing relationships between these circumferential angles $\theta_A$, $\theta_B$, $\theta_C$, $\theta_D$ and $\theta_E$.

Relationship Between $\theta_A$ and $\theta_C$

The circumferential angle $\theta_A$ indicates the relative length of each projection 106. The angle $\theta_C$ indicates the relative circumferential length of the open space between the adjacent stopper surfaces 111. The angle $\theta_A$ is much smaller than the circumferential angle $\theta_C$. The angle $\theta_C$ in the third embodiment is much larger than in either the first and second embodiments and is much larger than a corresponding circumferential length in a clutch disk assembly that employs a stop pin of prior art configurations. The increased circumferential space corresponding to the angle $\theta_C$ between the projections 106 increases torsion angles $\theta_{E1}$ and torsion angle $\theta_{E2}$. The torsion angles $\theta_{E1}$ and $\theta_{E2}$ represent the possible relative rotary displacement in each rotary direction of the hub flange 101 with respect to the plates 102 and 103. In the clutch disk assembly of the embodiment of the invention shown in the figures, the depicted angle $\theta_A$ is about 21 degrees, and the angle $\theta_C$ is about 69 degrees. However, various other angle combinations may be used. One important feature of the above configuration is that the stopper portions 116 are able to rotate beyond the end frame portions 154.

The angle $\theta_C$ of 40 degrees or more can achieve a superior effect which cannot be achieved by the prior art. The angle $\theta_C$ ranging from 50 to 80 degrees can improve the effect, the angle $\theta_C$ ranging from 60 to 80 degrees can further improve effect, and the angle $\theta_C$ ranging from 65 to 75 degrees can achieved the best effect.

The angle $\theta_C$ being more than twice as large as the angle $\theta_A$ can achieve a sufficient effect. The angle $\theta_C$ being more than three times as large as the angle $\theta_A$ can further improve the effect of the present invention. In the FIG. 9 a ratio between $\theta_A$ and $\theta_C$ is 1:3.29. The ratio in a range from 1:2 to 1:6 can achieve a sufficient effect, but the ratio in a range from 1:2.5 to 1:5.5 is believed to be an optimal range to achieve an overall desirable effect when contemplating other design considerations, such as manufacturing costs and strength of materials.

Relationship Between $\theta_C$ and $\theta_D$

The circumferential angle $\theta_D$ of each coupling portion 109 and corresponding stopper portion 116 is much smaller than the angle $\theta_C$. As can be seen from FIG. 14, a difference obtained by subtracting the angle $\theta_D$ from the angle $\theta_C$ is equal to the sum of the angle $\theta_E$, which is the sum of the angles $\theta_{E1}$ and $\theta_{E2}$. Thus, the damper mechanism has the maximum allowable torsion angle of $\theta_E$. The total possible displacement angle $\theta_E$ of the present invention is much larger than a corresponding angle in the prior art. As can be seen in FIG. 14, it is necessary to increase the angle $\theta_C$ and decrease the angle $\theta_D$ in order to increase the angle $\theta_E$. In the third embodiment, the angle $\theta_D$ represents the circumferential length of the stopper portion 116 and is depicted as being approximately 16 degrees. The angle $\theta_D$ is preferably 20 degrees or less, and more preferably in a range from 10 to 20 degrees.

If the angle $\theta_D$ is ½ or less of the angle $\theta_C$, then the angle $\theta_E$ can be sufficiently large. If the angle $\theta_D$ is equal to ⅓ of the angle $\theta_C$, then the angle $\theta_E$ can be further increased, and of the angle $\theta_D$ is equal to ¼ of the angle $\theta_C$, then the angle $\theta E$ can be further increased. In the illustrated embodiment, the ratio between the angles $\theta_D$ and $\theta_C$ is approximately 1:4.31. If this ratio is in a range from 1:2 to 1:6, then the angle $\theta_E$ can be sufficiently large. If it is in a range from 1:3 to 1:6, then the angle $\theta_E$ may be more preferable.

In the third embodiment as shown in the drawings, the angle $\theta_E$ is equal to about 53 degrees. It is preferable that the angle $\theta_E$ is 30 degrees or more. The angle $\theta_E$ ranging from 40 to 60 degrees can increase the maximum allowable torsion angle, which cannot be achieved in the prior art. The range from 45 to 55 degrees is the more preferred range.

The projections 106 are circumferentially shifted or offset with respect to the projecting portions 153 and the windows 105. More specifically, the circumferential center of each projection 106 is circumferentially offset in the direction R1 from the circumferential center of the projecting portion 153 and the window 105. As a result, the angles $\theta_{E1}$ and $\theta_{E2}$ are different. In other words, the stopper portion 116 between the circumferentially adjacent projections 106 is circumferentially offset in the direction R2. As a result, the angle $\theta_{E1}$ is larger than the angle $\theta_{E2}$.

Relationship Between $\theta_B$ and $\theta_D$

There are four windows 105 in the hub flange 101. Each of the windows defines a circumferential angle $\theta_B$ measured in a manner depicted in FIG. 10. The angle $\theta_B$ is measured at the radial center of the windows 105. The angle $\theta_B$ is preferably 50 degrees or more. The angle $\theta_B$ in FIG. 10 is about 61 degrees. This enables employment of the springs 104 which are sufficiently long in the circumferential direction and thus can provide a large maximum torsion displacement angle. The angle $\theta_B$ is preferably in a range from 50 to 70 degrees, and best in a range from 55 to 65 degrees.

The circumferential angle $\theta_D$ of each projection 106 is smaller than the circumferential angle $\theta_B$ of the windows 105. This means that a ratio of $\theta_E$ to $\theta_B$ is sufficiently large. Thus, the maximum allowable torsion angle of the damper mechanism is sufficiently large in the structure employing the windows 105 and the coil springs 104.

The angle $\theta_D$ is ½ or smaller than the angle $\theta_B$. The angle $\theta_D$ may be ⅓ or smaller than the angle $\theta_B$. In the third embodiment, a ratio of the angle $\theta_D$ to the angle $\theta_B$ is 1:3.81. The ratio of the angle $\theta_D$ to the angle $\theta_B$ should be in a range from 1:2 to 1:4. The ratio of the angle $\theta_D$ to the angle $\theta_B$ may preferably be in the range from 1:2.5 to 1:4.0.

Relationship Between $\theta_A$ and $\theta_B$

The circumferential angle $\theta_A$ of the projection 106 is smaller than the circumferential angle $\theta_B$ of the window 105. Accordingly, the ratio of the angle $\theta_A$ to the angle $\theta_B$ is smaller than that in the prior art, and thus, the ratio of $\theta_C$ to $\theta_B$ is larger than that in the prior art. The circumferential angle $\theta_A$ is preferably ⅔ or less of the circumferential angle $\theta_B$, and more preferably ½ or less. In the third embodiment, a ratio between $\theta_A$ and $\theta_B$ is 1:2.90.

Relationship Between $\theta_B$ and $\theta_E$

Both the angles $\theta_B$ and $\theta_E$ are larger than corresponding angles in the prior art, and thus the maximum allowable torsion angles of the damper mechanism is large.

The ratio of the angle $\theta_E$ to the angle $\theta_B$ is 1:1.13 in the third embodiment. If this ratio should be in the range from 1:1.0 to 1:1.3. The optimal range should be from 1:1.1 to 1:1.2.

Radial Length $r_2$ of Window 105

In the damper mechanism according to the third embodiment, the windows 105 have a large radial length $r_2$ compared with the radial length $r_3$ of the hub flange 101, as seen in FIG. 7A. Such a window can accommodate a large spring, so that more flexibility in design of the spring is given. The radial length of the windows 105 is 35% or more of the radius of the hub flange 101 (from the center 0 to the outer periphery of the projection 106). The ratio of the radial length of the windows 105 to the radius of the flange 101 is in a range from 35% to 55%, and more preferably the range from 40 to 50%.

Operation

Description will now be given on the operation of the damper mechanism of the clutch disk assembly with reference to FIG. 13. In the following description, it is assumed that the plates 102 and 103 rotate in accordance with clutch engagement with a flywheel (not shown), and the hub flange 101 may undergo relative rotation in the direction R2 (reversely to the rotating direction) with respect to the plates 102 and 103.

When the hub flange 101 twists or rotates in the direction R2 relatively to the plates 102 and 103, the contact portion 150 at the forward side of each window 105 pushes the coil spring 104 in the direction R2. Thereby, the coil spring 104 is compressed in the circumferential direction between the contact portion 150 and the support surfaces 108a of the first and second supports 108 of the plates 102 and 103. When the torsion angle reaches the angle $\theta_{E1}$, a stopper surface 111 of each projection 106 comes into contact with the stopper portion 116.

(Alternate Embodiments)

The coupling portions 30 and 109 may integrally extend from the clutch plate. The coupling portions 30 and 109 may be formed of members independent from the clutch and retaining plates.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed is:

1. A damper disc assembly comprising:
   a first rotary plate formed with a plurality of extending portions, each of said extending portions being formed with a window, each of said extending portions having a projection at a radially outermost portion of said extending portion;
   a second rotary plate arranged coaxially at a first axial side of said first rotary plate, and having a plurality of first supports corresponding to said plurality of windows, respectively;
   a third rotary plate arranged coaxially at a second axial side of said first rotary plate, and having a plurality of second supports corresponding to said plurality of windows, respectively;
   a plurality of plate-like coupling portions coupling outer peripheral portions of said second and third rotary plates together, and each having a radial length shorter than a circumferential length thereof, a radially outer portion of each of said plate-like coupling portions defining a stopper portion; and
   a plurality of springs arranged within said windows and said first and second supports, elastically coupling said first rotary plate to said second and third rotary plates in the circumferential direction, and being compressed between said windows and said first and second supports when said first rotary plate rotates relative to said second and third rotary plates, wherein
   each of said plate-like coupling portions being arranged circumferentially between said extending portions, and being able to contact circumferentially with said projections formed on said extending portions in response to relative rotation between said first rotary plate and said second and third rotary plates, said stopper portions and said projections being configured such that said first rotary plate and said second and third rotary plates may undergo relative rotation with respect to one another within an angular displacement range of at least 30°.

2. The damper disc assembly according to claim 1, wherein a circumferential angle $\theta_A$ defined by said projections is smaller than a circumferential angle $\theta_B$ defined by said windows.

3. The damper disc assembly according to claim 2, wherein said circumferential angle $\theta_A$ is less than ⅔ of said circumferential angle $\theta_B$.

4. The damper disc assembly according to claim 3, wherein said circumferential angle $\theta_A$ is less than ½ of said circumferential angle $\theta_B$.

5. The damper disc assembly according to claim 1, wherein a pair of spaces between one of said stopper portions and an adjacent pair of said projections defines a circumferential angle $\theta_E$, and said angle $\theta_E$ is greater than 30 degrees.

6. The damper disc mechanism according to claim 5, wherein said circumferential angle $\theta_E$ is greater than 40 degrees.

7. A damper disc assembly comprising:

a first rotary plate provided with a plurality of radially outwardly extending portions, a plurality of windows formed in said extending portions, respectively, and a plurality of projections extending radially outward from outer peripheries of said extending portions, respectively, a circumferential angle $\theta_A$ of said projection is smaller than a circumferential angle $\theta_B$ of said windows;

a second rotary plate arranged coaxially at a first side of said first rotary plate, and having a plurality of first supports corresponding to said plurality of windows, respectively;

a third rotary plate arranged coaxially at a second axial side of said first rotary plate, and having a plurality of second supports corresponding to said plurality of windows, respectively;

a plurality of plate-like coupling portions coupling outer peripheral portions of said second and third rotary plates together, and each having a radial length shorter than a circumferential length thereof; and a plurality of springs arranged within said windows and said first and second supports, and elastically coupling said first rotary plate to said second and third rotary plates in the circumferential direction, said plurality of springs being compressed between said windows and said first and second supports when said first rotary plate rotates relatively to said second and third rotary plates, each of said plate-like coupling portions being arranged circumferentially between said projections, and being able to contact circumferentially with one of said projections when said first rotary plate rotates relatively to said second and third rotary plates.

8. A damper disc assembly comprising:

a first rotary plate having a plurality of windows and a plurality of cutaways formed circumferentially between said windows, said first rotary plate being provided with a plurality of projections at an outer periphery thereof;

a second rotary plate arranged coaxially at a first axial side of said first rotary plate, and having a plurality of first supports corresponding to said plurality of windows, respectively;

a third rotary plate arranged coaxially at a second axial side of said first rotary plate, and having a plurality of second supports corresponding to said plurality of windows, respectively;

a plurality of plate-like coupling portions for connecting said second rotary plate and said third rotary plate, each of said coupling portions having a stopper portion integrally extending in an axial direction from a radially outer end of said third rotary plate to said second rotary plate, and a fixing portion extending from said stopper portion in a radially inward direction, said stopper portion extending in an axial direction through one of said cutaways, said coupling portion being fixed to said second rotary plate; and a plurality of springs, one of said springs being disposed in a corresponding one of said windows and said first and second supports, elastically coupling said first rotary plate to said second and third rotary plates in the circumferential direction, said springs being compressible between said windows and said first and second supports in response to relative rotary displacement between said first rotary plate and said second and third rotary plates, each of said stopper portions being disposed circumferentially between said projections, said stopper portions being configured to contact said stoppers in response to relative rotation between said first rotary plate and said second and third rotary plate, said third rotary plate being formed with apertures axially corresponding to said fixing portions, said fixing portions being smaller than said cutaways.

9. The damper disc assembly according to claim 8, wherein a circumferential angle $\theta_A$ defined by said projections is smaller than a circumferential angle $\theta_B$ defined by said windows.

10. The damper disc assembly according to claim 9, wherein said circumferential angle $\theta_A$ is less than ⅔ of said circumferential angle $\theta_B$.

11. The damper disc assembly according to claim 10, wherein said circumferential angle $\theta_A$ is less than ½ of said circumferential angle $\theta_B$.

12. The damper disc assembly according to claim 8, wherein a pair of spaces between one of said stopper portions and an adjacent pair of said projections defines a circumferential angle $\theta_E$, and said circumferential angle $\theta_E$ is greater than 20 degrees.

13. The damper disc mechanism according to claim 12, wherein said circumferential angle $\theta_E$ is greater than 30 degrees.

14. The damper disc assembly according to claim 13, wherein said circumferential angle $\theta_E$ is greater than 40 degrees.

15. A damper disk assembly comprising:

a pair of first circular plates axially opposed to each other, said first circular plates formed with first windows;

a second circular plate disposed between said paired first circular plates, said second circular plate being configured for limited relative rotation with respect to said pair of said first circular plates, and said second circular plate being formed with plate extending portions, said plate extending portions defining a plurality of circumferentially extending recesses therebetween, said extending portions further being formed with second windows conforming generally to said first windows in said first circular plates, each of said extending portions further being formed with a protrusion extending radially outward from an outer peripheral portion of said extending portion, circumferential ends of said protrusions defining stopper surfaces which further define said recesses;

elastic members disposed in said first and second windows and being adapted to be compressed in response to relative rotation between said first circular plates and said second circular plate; and a first of said paired first circular plates being formed with a plurality of plate coupling portions formed homogeneously with said first of said paired first circular plates, each of said plate coupling portions extending in a generally axial direction from an outer circumferential edge of said first of said paired first circular plates, each of said plate coupling portions extending through a corresponding one of said recesses formed in said second circular plate between corresponding pairs of said stopper surfaces, each of said plate coupling portions further formed with a radially inwardly extending portion, said radially inwardly extending portion being connected to a second of said paired first circular plates; wherein said plate coupling portions define stoppers that are configured to engage circumferential ends of said recesses in response to relative rotation between said second circular plate and said paired first circular plates thus limiting relative rotation therebetween, and said protrusions having a circumferential length that is smaller than a circumferential length of said plate extending portions.

16. The damper disk assembly according to claim 15, wherein each of said recesses formed in said second circular plate has a circumferential length of greater than 50° between said stopper surfaces.

17. A damper disc assembly comprising:

a first rotary plate having a plurality of windows and a plurality of projections projecting radially outward radially corresponding to said windows, respectively, said projections defining a circumferential angle $\theta_A$, said windows defining a circumferential angle $\theta_B$, said angle $\theta_A$ being smaller than said angle $\theta_B$, said projections having circumferential ends located circumferentially inside circumferential ends of said windows neighboring thereto;

a second rotary plate arranged coaxially at a first axial side of said first rotary plate, and having a plurality of first supports corresponding to said plurality of windows, respectively;

a third rotary plate arranged coaxially at a second axial side of said first rotary plate, and having a plurality of second supports corresponding to said plurality of windows, respectively;

a plurality of plate-like coupling portions coupling outer peripheral portions of said second and third rotary plates together, and each having a radial length shorter than a circumferential length thereof; and a plurality of springs arranged within said windows and said first and second supports, and elastically coupling said first rotary plate to said second and third rotary plates in the circumferential direction, said plurality of springs being compressed between said windows and said first and second supports when said first rotary plate rotates relatively to said second and third rotary plates, each of said plate-like coupling portions being arranged circumferentially between said projections, and being able to contact circumferentially with one of said projections when said first rotary plate rotate relatively to said second and third rotary plates.

* * * * *